United States Patent [19]

Henke

[11] 4,131,309
[45] Dec. 26, 1978

[54] VEHICLE WIND DEFLECTOR

[76] Inventor: Lowell D. Henke, P.O. Box 1505, Conrad, Mont. 59425

[21] Appl. No.: 836,028

[22] Filed: Sep. 23, 1977

[51] Int. Cl.² .............................................. B62D 35/00
[52] U.S. Cl. ...................................................... 296/1 S
[58] Field of Search .................... 296/1 S, 91; 105/2 R

[56] References Cited

U.S. PATENT DOCUMENTS

| | | | |
|---|---|---|---|
| 3,762,758 | 10/1973 | Wilkerson | 296/1 S |
| 3,929,202 | 12/1975 | Hobbensiefken | 296/1 S |
| 3,947,065 | 3/1976 | Geiger | 296/1 S |
| 3,951,222 | 4/1976 | Fletcher | 296/1 S |
| 3,999,796 | 12/1976 | Greene et al. | 296/1 S |

Primary Examiner—Richard A. Bertsch
Attorney, Agent, or Firm—Arthur L. Urban

[57] ABSTRACT

In a cab-over-engine vehicle, a wind deflector extending from the front thereof and a bumper assembly located below the wind deflector extending beyond the leading edge of the wind deflector; the wind deflector including a first section extending downwardly and forwardly from the vehicle body and diminishing in width from a width substantially the same as that of the vehicle body at a point adjacent the lower edge of the windshield to a reduced width at its most forward edge, a second section extending downwardly and rearwardly from the leading edge of the first section toward the bottom of the vehicle body, an opening in the second section adjacent the radiator opening of the vehicle body, and side sections extending from the side edges of the first and second sections toward the sides of the vehicle body, said first section being positioned in a plane intersecting the top of the vehicle body and said second section being positioned in a plane intersecting the bottom of the vehicle body.

10 Claims, 6 Drawing Figures

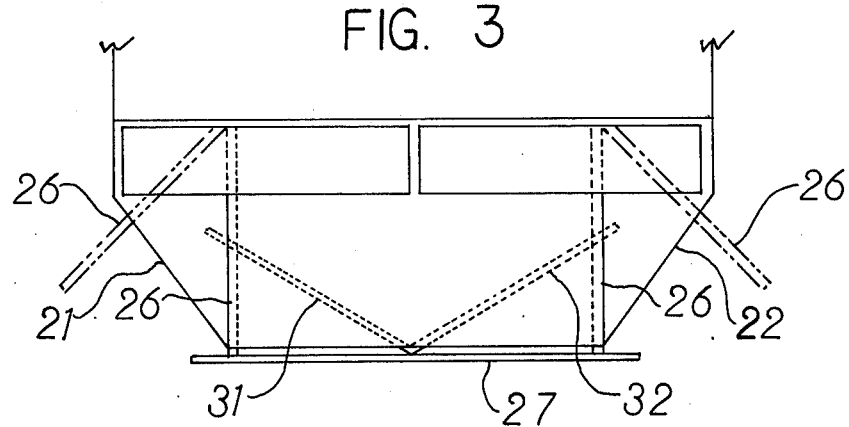
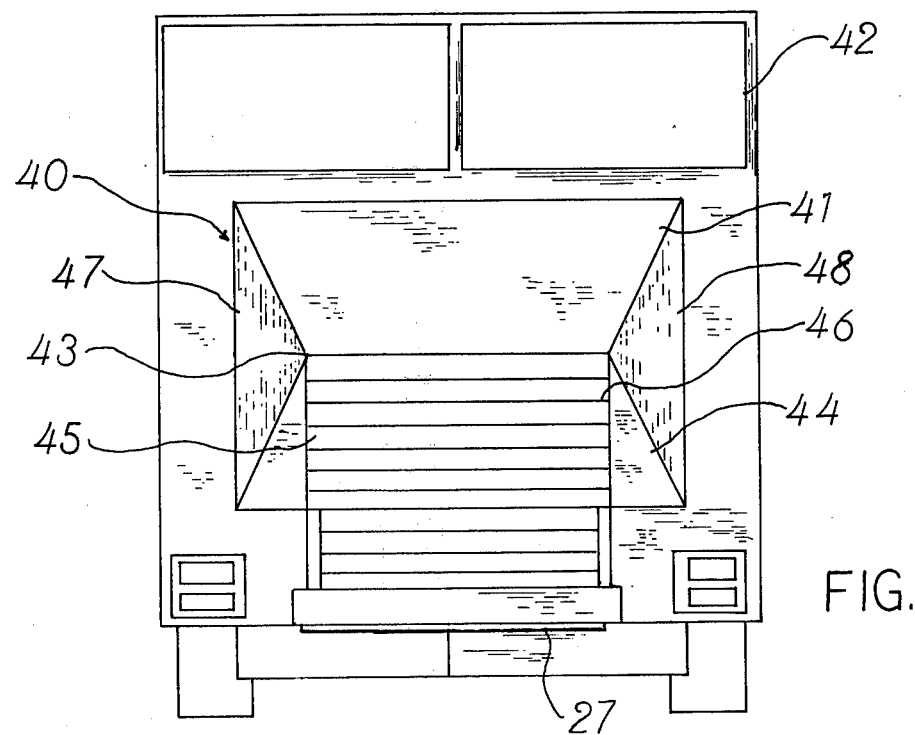

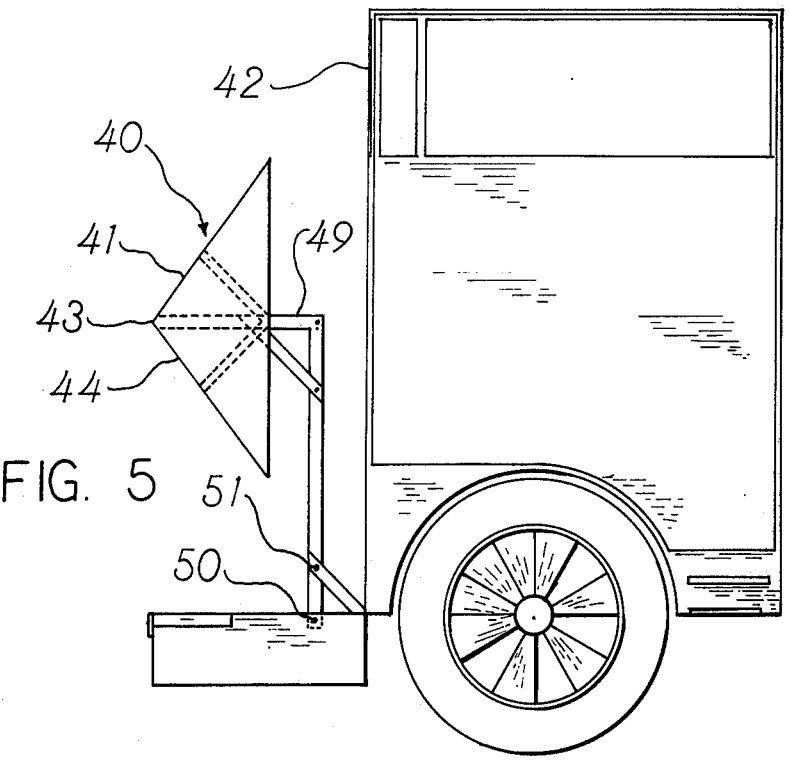
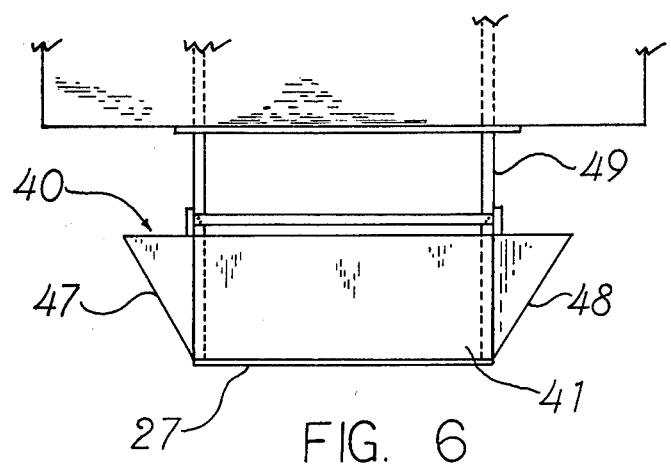

VEHICLE WIND DEFLECTOR

This invention relates to a novel vehicle wind deflector and more particularly relates to a wind deflector for cab-over-engine vehicles and other vehicles having flat fronts, e.g. buses.

Cab-over-engine vehicles have become quite popular in recent years because they reduce the proportion of the vehicle occupied by the engine and the driver compartment. Positioning the driver compartment over the engine provides a significant increase in cargo sapce which means a greater payload and increased profits.

One of the disadvantages of cab-over-engine vehicles, however, has been the increased wind resistance caused by the relatively flat front surface presented to the wind as the vehicle moves down the highway. This increased wind drag requires that the engine produce more power to move the vehicle at the same speed. A greater power requirement necessitates that the engine be larger and/or that it use more fuel. With the recent sharp increases in fuel costs, the greater fuel requirement has become a serious drawback to cab-over-engine vehicles.

The present invention provides a novel wind deflector for cab-over-engine vehicles which results in significant improvements in the fuel economy of such vehicles. These improvements in fuel economy are achieved with the wind deflector of the invention without significantly increasing the overall length of the vehicle. Also, the novel design of the wind deflector does not hinder driver vision. In addition, the wind deflector is simple in design and can be fabricated from available materials.

Other benefits and advantages of the novel wind deflector of the present invention will be apparent from the following description and the accompanying drawings in which:

FIG. 3 is a top view of the wind deflector shown in Figure;

FIG. 4 is a front view of another form of the novel wind deflector of the present invention mounted on the front of a cab-over-engine vehicle;

FIG. 5 is a side view of the wind deflector shown in FIG. 4; and

FIG. 6 is a top view of the wind deflector shown in FIG. 4.

Figure 1:
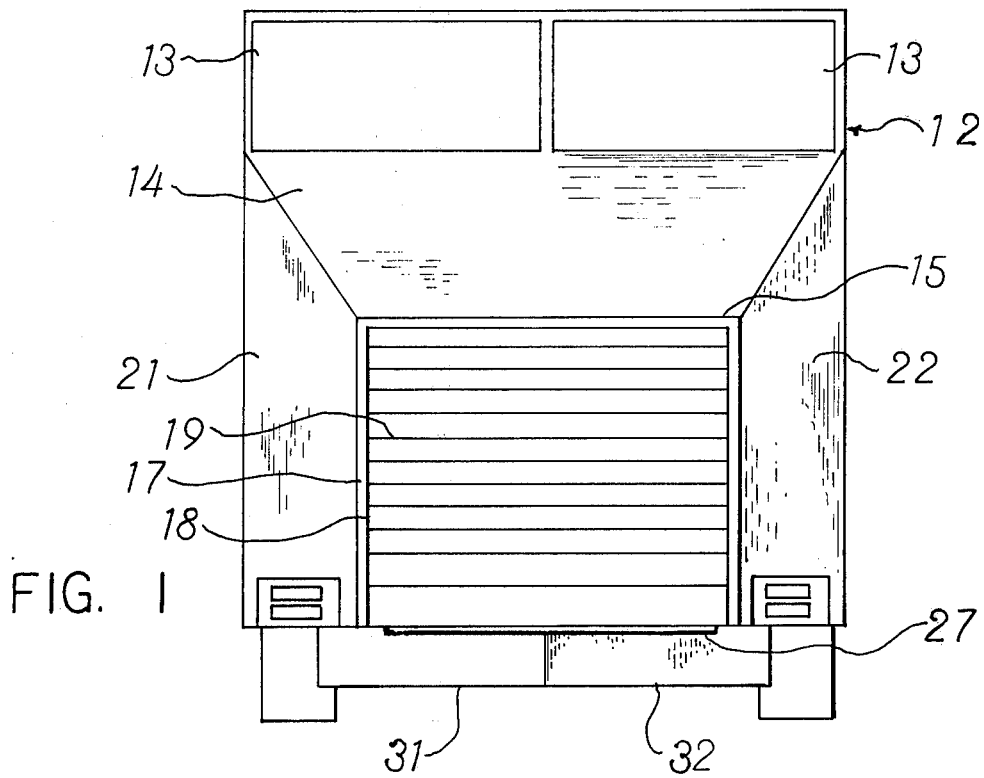
FIG. 1 is a front view of one form of the novel wind deflector of the present invention on a cab-over-engine vehicle.
Figure 2:
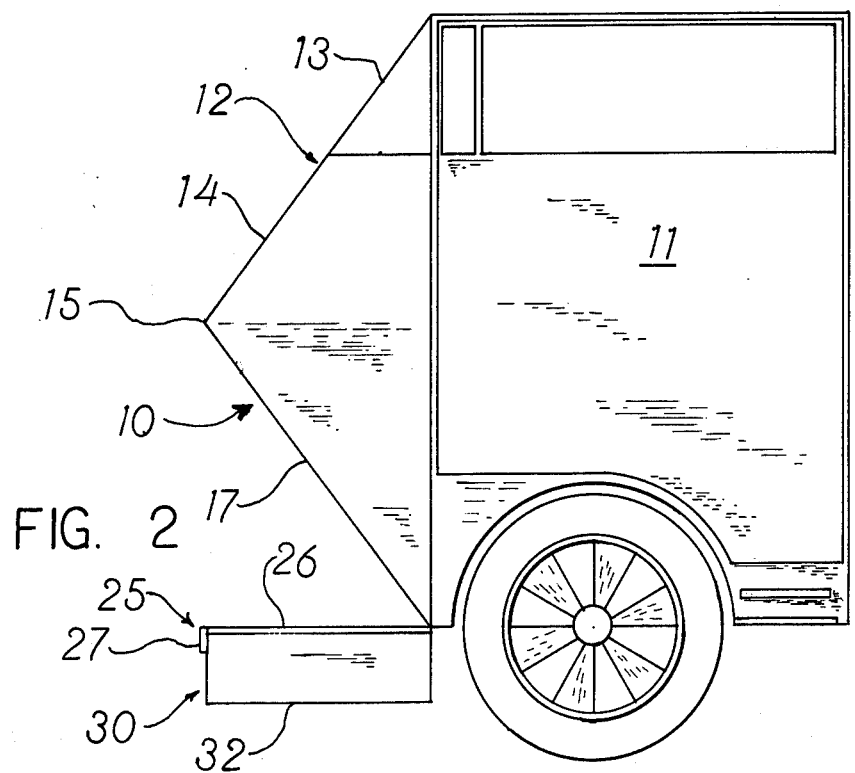
FIG. 2 is a side view of the wind deflector shown in FIG. 1.

As shown in FIGS. 1–3 of the drawings, a novel wind deflector 10 of the present invention for the front of a vehicle body 11 includes a first section 12 which extends downwardly and forwardly from the top of the vehicle body 11. First section 12 has a transparent upper portion 13 that has a uniform width substantially the same as the vehicle body 11. First section 12 also has a lower portion 14 which extends from transparent portion 13 to the leading edge 15 at the bottom of the first section 12. Lower portion 14 diminishes in width from substantially full body width where it connects with transparent portion 13 to a significantly smaller width at edge 15.

A second section 17 extends downwardly and rearwardly from leading edge 15 to the bottom of the vehicle body 11. Second section 17 has an opening 18 therein adjacent the radiator opening (not shown) of the vehicle body 11. The opening 18 may have a suitable decorative grillwork 19 over the opening. Advantageously, second section 17 has a substantially uniform width from top to bottom. Side sections 21 and 22 extend from the side edges of sections 12 and 17 to the sides of the vehicle body 11.

Bumper assembly 25 extends forwardly from vehicle body 11 below the wind deflector 10. The bumper assembly 25 extends beyond the leading edge 15 of the wind deflector. Advantageously, the arms 26 of the bumper assembly 25 are hinged adjacent the vehicle body 11. As shown in FIG. 3, by removing face bar 27 affixed across the ends of arms 26, the arms can be pivoted so they will allow the body 11 to swing completely from the engine.

A second wind deflector 30 preferably is attached to the bumper assembly 25 below wind deflector 10. Deflector 30 has two substantially vertical sections 31 and 32 which are joined adjacent the midpoint of the face bar 27 of the bumper assembly. The vertical sections 31 and 32 extend rearwardly and outwardly from each other toward the sides of the vehicle body 11, as shown in FIG. 3.

Another form of the novel wind deflector of the invention is illustrated in FIGS. 4–6 of the drawings. This wind deflector provides some of the benefits of the invention and reduces wind drag to a lesser degree than the deflector of FIGS. 1–3 but is less expensive to fabricate and is more easily mounted on a vehicle body. Wind deflector 40 has a first section 41 extending forwardly and downwardly below windshield 42. The width of section 41 diminishes from its top to leading edge 43.

A second section 44 extends downwardly and rearwardly from leading edge 43 toward the bottom of the vehicle body 11. Second section 44 has an opening 45 with grillwork 46 therein adjacent the radiator opening (not shown) of the vehicle body. The width of second section 44 as shown in FIG. 4 increases in width from leading edge 43 to its bottom edge. Advantageously, sections 41 and 44 are mirror images of each other except for the opening 45 in section 44. Side sections 47 and 48 of a generally triangular shape extend between the sides of sections 41, 44.

Wind deflector 40 is mounted on a frame 49 which extends forwardly from the bottom of vehicle body 11. Preferably, frame 49 is of a size which allows section 41 to be positioned in a plane intersecting the top of the vehicle body and section 44 to be positioned in a plane intersecting the bottom of the vehicle body. Frame 49 is pivotable about point 50 by removing pin 51 from the frame. This allows body 11 to swing away from the engine for servicing.

The wind deflector of the invention may be fabricated from commercially available materials. Metals such as aluminum or steel sheets may be employed. Also, the deflector may be molded of plastic which advantageously is reinforced with glass fiber. The deflector can replace the conventional flat front panel of a vehicle body or may be secured over the flat front panel as shown in FIGS. 1–3. Alternatively, a wind deflector such as deflector 40 of FIGS. 4–6, may be mounted in front of the front panel of the vehicle body.

The size and specific shape of the wind deflector will depend upon the particular vehicle to which the deflector is to be fitted. The angle between the first and second sections will depend upon the spacing of the leading edge from the front of the body and the overall height of the body. Advantageously, the leading edge of the deflector extends forward from the front panel of the vehicle, a distance between about 25% and 50% of the width of the body. For example, with a tractor cab eight feet wide, the deflector may extend about two to four feet from the body. The width of the deflector at the leading edge preferably is between about three and six feet and particularly between about four and five feet for an eight foot wide body.

The above description and the accompanying drawings show that the present invention provides a novel wind deflector for cab-over-engine vehicles which reduces the wind drag normally encountered with such vehicles. Moreover, because of such reductions in wind resistance, vehicles incorporating the wind deflector of the invention show significant increases in fuel economy. Also, the wind deflector does not hinder driver vision nor significantly increase the overall length of the vehicle. Further, the wind deflector of the invention is simple in design and can be fabricated from commercially available materials.

It will be apparent that various modifications can be made in the specific wind deflectors described in detail above and shown in the drawings within the scope of the invention. For example, the transparent portion or the wind deflector can be enlarged or the shape changed for particular cab designs or special requirements. Also, if desired, the configuration of the bumper assembly can be modified for the specific vehicle. Therefore, the invention is to be limited only by the following claims.

What is claimed is:

1. A frontal assembly for attachment to a cab-over-engine type vehicle including a wind deflector extending from the front thereof and a bumper assembly located below said wind deflector extending beyond the leading edge of said wind deflector; said wind deflector including a plurality of substantially flat sections with a first section extending downwardly and forwardly from the vehicle body and diminishing in width from a width substantially the same as that of said vehicle body at a point adjacent the lower edge of the windshield of said vehicle to a reduced width at its most forward edge, a second section extending downwardly and rearwardly from said leading edge of said first section toward the bottom of said vehicle body, and side sections extending from the side edges of said first and second sections toward the sides of said vehicle body, said first section being positioned in a plane intersecting the top of said vehicle body and said second section being positioned in a plane intersecting the bottom of said vehicle body.

2. In a cab-over-engine vehicle according to claim 1 wherein said wind deflector extends forward a distance between about 25% and 50% of the width of said vehicle body.

3. In a cab-over-engine vehicle according to claim 1 wherein said first section of said wind deflector has a transparent upper portion extending to the top of said vehicle body.

4. In a cab-over-engine vehicle according to claim 1 wherein said second section of said wind deflector extends to the bottom of said vehicle body.

5. In a cab-over-engine vehicle according to claim 1 wherein said bumper assembly includes arms extending forwardly from said vehicle body, said arms being hinged adjacent said vehicle body.

6. In a cab-over-engine vehicle according to claim 1 wherein a second wind deflector is attached to said bumper assembly, said second wind deflector including two substantially vertical sections which are joined adjacent the midpoint of said bumper assembly with the respective sections extending rearwardly and outwardly toward each of the side edges of said vehicle body.

7. In a cab-over-engine vehicle according to claim 1 wherein said second section has a substantially uniform width from top to bottom.

8. In a cab-over-engine vehicle according to claim 1 wherein said wind deflector is formed of a molded plastic.

9. In a cab-over-engine vehicle according to claim 1 wherein said wind deflector is formed of metal sheets.

10. In a cab-over-engine vehicle according to claim 1 wherein said wind deflector is attached to a pivotable frame extending forwardly from said vehicle body.

* * * * *